(12) United States Patent
Tomita et al.

(10) Patent No.: US 10,315,961 B2
(45) Date of Patent: Jun. 11, 2019

(54) POROUS MATERIAL AND HEAT INSULATING FILM

(71) Applicant: NGK INSULATORS, LTD., Aichi-prefecture (JP)

(72) Inventors: Takahiro Tomita, Nagoya (JP); Hiroharu Kobayashi, Nagoya (JP); Akinobu Oribe, Nagoya (JP)

(73) Assignee: NGK INSULATORS, LTD., Aichi-prefecture (JP)

( * ) Notice: Subject to any disclaimer, the term of this patent is extended or adjusted under 35 U.S.C. 154(b) by 449 days.

(21) Appl. No.: 15/159,995

(22) Filed: May 20, 2016

(65) Prior Publication Data

US 2016/0264479 A1    Sep. 15, 2016

Related U.S. Application Data

(63) Continuation of application No. PCT/JP2014/080988, filed on Nov. 18, 2014.

(30) Foreign Application Priority Data

Nov. 26, 2013    (JP) ................................ 2013-244390

(51) Int. Cl.
| | |
|---|---|
| *C04B 38/00* | (2006.01) |
| *C01G 25/02* | (2006.01) |
| *C04B 35/48* | (2006.01) |
| *F16L 59/02* | (2006.01) |

(52) U.S. Cl.
CPC ............ *C04B 38/009* (2013.01); *C01G 25/02* (2013.01); *C04B 35/48* (2013.01); *C04B 38/00* (2013.01); *F16L 59/02* (2013.01); *F16L 59/028* (2013.01); *C01P 2004/04* (2013.01); *C01P 2004/54* (2013.01); *C01P 2004/61* (2013.01); *C01P 2004/62* (2013.01); *C01P 2006/16* (2013.01)

(58) Field of Classification Search
CPC ....... C04B 38/00; C04B 39/009; C04B 35/48; C01G 25/02; F16L 59/02; F16L 59/028
USPC ......................................................... 252/62
See application file for complete search history.

(56) References Cited

U.S. PATENT DOCUMENTS

| 7,335,616 B2 | 2/2008 | Saint-Ramond et al. |
|---|---|---|
| 7,396,592 B2 | 7/2008 | Saint-Ramond et al. |
| 2005/0161678 A1 | 7/2005 | Weinert et al. |
| 2005/0252410 A1 | 11/2005 | Bujard et al. |
| 2006/0257662 A1 | 11/2006 | Bujard et al. |
| 2007/0179041 A1 | 8/2007 | Muroi et al. |
| 2007/0237971 A1 | 10/2007 | Saint-Ramond et al. |
| 2008/0088067 A1 | 4/2008 | Saint-Ramond et al. |
| 2008/0090100 A1 | 4/2008 | Saint-Ramond et al. |
| 2010/0003520 A1 | 1/2010 | Bujard et al. |
| 2014/0352646 A1 | 12/2014 | Tomita et al. |

FOREIGN PATENT DOCUMENTS

| JP | 63-43348 B2 | 8/1988 |
|---|---|---|
| JP | 03-016983 A | 1/1991 |
| JP | 3-261662 A | 11/1991 |
| JP | 2001-089144 A | 4/2001 |
| JP | 2002-201072 A | 7/2002 |
| JP | 2006-521463 A | 9/2006 |
| JP | 2008-511524 A | 4/2008 |
| JP | 2008-200922 A | 9/2008 |
| JP | 2010-209472 A | 9/2010 |
| JP | 2011-052630 A | 3/2011 |
| WO | WO2004/065295 A1 | 8/2004 |
| WO | WO2006/024098 A1 | 3/2006 |
| WO | WO2011/027214 A2 | 3/2011 |
| WO | WO2013/129430 A1 | 2/2013 |

OTHER PUBLICATIONS

International Search Report and Written Opinion for PCT Patent App. No. PCT/JP2014/080988 (dated Feb. 24, 2015) with English language translation of the ISR.
Office Action from Japanese Patent App. No. 2015-550914 (dated Jan. 30, 2018).

*Primary Examiner* — Edward M Johnson
(74) *Attorney, Agent, or Firm* — Cermak Nakajima & McGowan LLP; Tomoko Nakajima

(57) ABSTRACT

Provided herein is porous material which includes, as a framework of a porous structure, $ZrO_2$ particles and a dissimilar material present on the surfaces of the $ZrO_2$ particles. The dissimilar material includes at least one oxide selected from a first group of oxides and at least one oxide selected from a second group of oxides, or both. The first group of oxides includes, but is not limited to, $SiO_2$, $TiO_2$, $La_2O_3$, $Al_2O_3$, $SrCO_3$, $Gd_2O_3$, $Nb_2O_5$, $Y_2O_3$, and a complex oxide including two or more of these oxides. The second group of oxides includes, but is not limited to, $SiO_2$, $TiO_2$, $La_2O_3$, $Al_2O_3$, $SrCO_3$, $Gd_{203}$, $Nb_2O_5$, $Y_2O_3$, and a complex oxide including two or more of the oxides, and $ZrO_2$.

8 Claims, 2 Drawing Sheets
(1 of 2 Drawing Sheet(s) Filed in Color)

[FIG. 1]
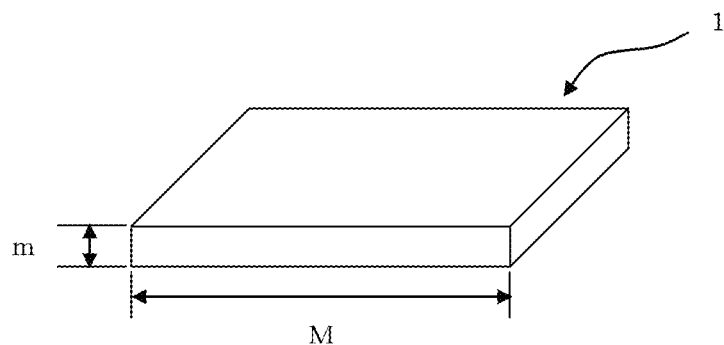
[FIG. 2]
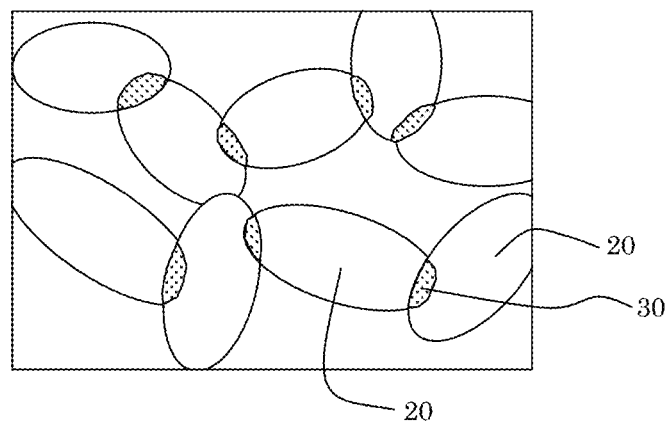
[FIG. 3]
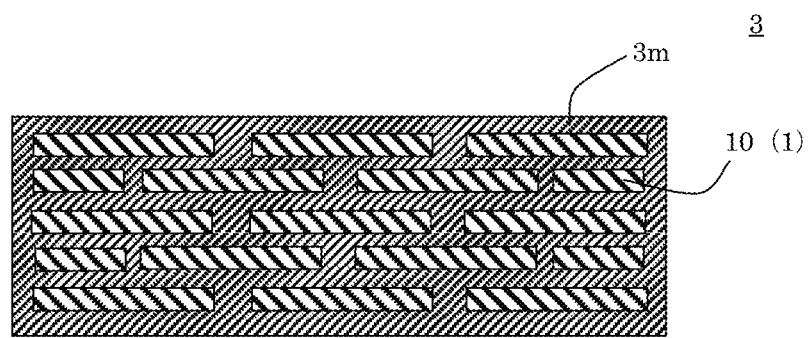

[FIG. 4]
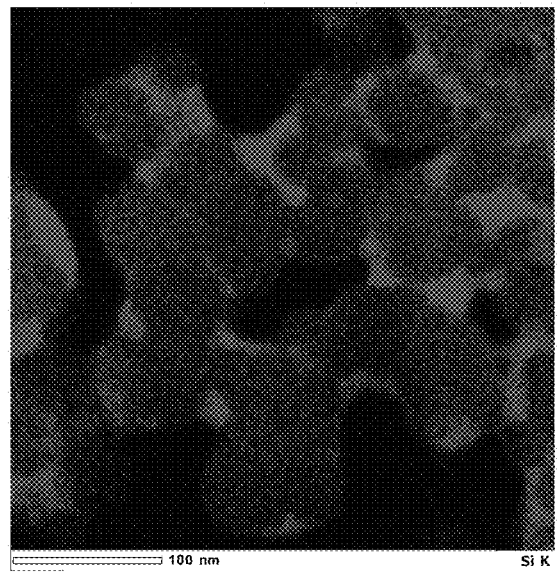
[FIG. 5]
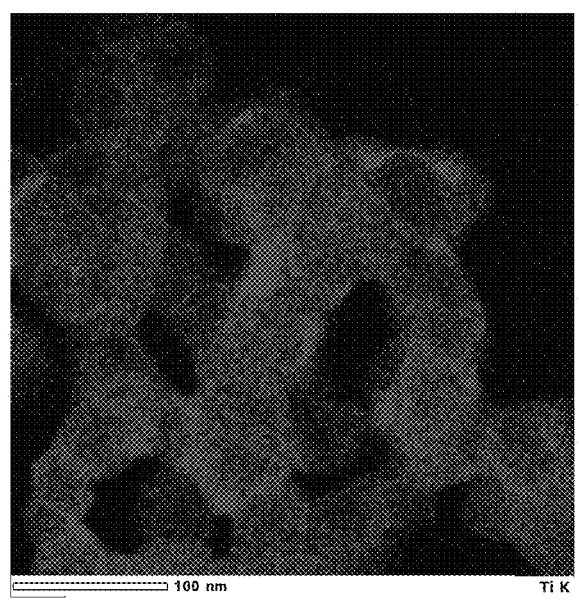

POROUS MATERIAL AND HEAT INSULATING FILM

TECHNICAL FIELD

The present invention relates to a porous material and a heat insulating film. More particularly, it relates to a porous material which is usable as a material of a heat insulating film excellent in heat insulating performance, and the heat insulating film.

BACKGROUND ART

There is required a heat insulating film which is formed on a surface to improve a heat insulating efficiency and flame retardance. In Patent Document 1, a coating film is disclosed which has a high surface hardness and can prevent the surface from being damaged. The coating film is formed by dispersing hollow particles made of silica shells in a binder. By a wear resistance and high hardness of the hollow particles made of silica shells, the wear resistance of a substrate on which the coating film is formed can be improved. Additionally, the flame retardance can be improved by heat insulating properties of the hollow particles made of the silica shells.

In Patent Document 2, there is disclosed an internal combustion engine including a structural member having an improved heat insulating performance. In the internal combustion engine of Patent Document 2, a heat insulating material is disposed adjacent to an inner wall of an exhaust passage, and a high-temperature operative gas (an exhaust gas) flows along through channels made of the heat insulating material. In the heat insulating material, mesoporous silica sphere (MSS) particles having an average particle diameter of 0.1 to 3 μm are laminated in a state where the respective particles are densely bonded to one another via a bonding material. In the MSS particles, an infinite number of mesopores having an average pore diameter of 1 to 10 nm are formed.

CITATION LIST

Patent Documents

[Patent Document 1] JP-A-2008-200922
[Patent Document 2] JP-A-2011-52630

SUMMARY OF THE INVENTION

Problem to be Solved by the Invention

In Patent Document 1, hollow particles made of silica shells having outer diameters of about 30 to 300 nm are dispersed in an organic resin binder, an inorganic polymer binder or an organic/inorganic composite binder to form a coating film, and the formed coating film exerts heat insulating properties. Additionally, in Patent Document 2, there are densely laminated MSS (mesoporous silica sphere) particles having mesopores in which an average particle diameter is from 0.1 to 3 μm and an average pore diameter is from 1 to 10 nm. Therefore, in Patent Document 2, a heat insulating performance can be obtained.

However, even when the material described in Patent Document 1 or 2 is used, the heat insulating performance of a heat insulating film obtained by using this material is not sufficient, and there has earnestly been desired development of a material of the heat insulating film further excellent in heat insulating performance. That is, even when the material described in Patent Document 1 or 2 is used, a thermal conductivity of the heat insulating film obtained by using this material is not sufficiently low.

The present invention has been developed in view of such problems of the conventional technology. Objects thereof are to provide a porous material which is usable as a material of a heat insulating film excellent in heat insulating performance, and to provide the heat insulating film.

Means for Solving the Problem

According to the present invention, there are provided a porous material and a heat insulating film as follows.

[1] A porous material having a porous structure in which a plurality of pores are formed, and having, as a framework of the porous structure, $ZrO_2$ particles and a dissimilar material present on the surfaces of the $ZrO_2$ particles, the dissimilar material including at least one selected from a first group, at least one selected from a second group, or both of the at least one selected from the first group and the at least one selected from the second group, wherein the first group is a group consisting of $SiO_2$, $TiO_2$, $La_2O_3$, $Al_2O_3$, $SrCO_3$, $Gd_2O_3$, $Nb_2O_5$, $Y_2O_3$, and a complex oxide including two or more of these oxides, and the second group is a group consisting of $SiO_2$, $TiO_2$, $La_2O_3$, $Al_2O_3$, $SrCO_3$, $Gd_2O_3$, $Nb_2O_5$, $Y_2O_3$, and a complex oxide including at least one selected from the group consisting of the complex oxide including two or more of these oxides, and $ZrO_2$.

[2] The porous material according to the above [1], wherein the dissimilar material includes at least two selected from the group consisting of $SiO_2$, $TiO_2$, $La_2O_3$ and $La_2Zr_2O_7$.

[3] The porous material according to the above [1] or [2], wherein a content ratio of the dissimilar material is from 0.1 to 30 vol %.

[4] The porous material according to any one of the above [1] to [3], wherein a diameter of the dissimilar material is smaller than a diameter of the $ZrO_2$ particles.

[5] The porous material according to any one of the above [1] to [4], wherein a diameter of the dissimilar material is from 0.1 to 300 nm.

[6] The porous material according to any one of the above [1] to [5], wherein a thermal conductivity is 1 W/mK or less.

[7] The porous material according to any one of the above [1] to [6], which is granulous piece in a size of 1 mm or less.

[8] The porous material according to any one of the above [1] to [7], which is a plate having an aspect ratio of 3 or more and a minimum length of 0.1 to 50 μm.

[9] A heat insulating film having the porous material according to any one of the above [1] to [8], and a matrix in which the porous material is dispersed.

Effect of the Invention

A porous material of the present invention has, as a framework of a porous structure, $ZrO_2$ particles and a dissimilar material present on the surfaces of the $ZrO_2$ particles, and the dissimilar material is at least one selected from the group consisting of $SiO_2$, $TiO_2$, $La_2O_3$, $Al_2O_3$ and the like. Therefore, the porous material of the present invention is usable as a material of a heat insulating film excellent in heat insulating performance.

The heat insulating film of the present invention includes the porous material of the present invention as a material.

Therefore, the heat insulating film of the present invention is excellent in heat insulating performance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a perspective view schematically showing one embodiment of a porous material of the present invention;

FIG. 2 is an enlarged view schematically showing one embodiment of $ZrO_2$ particles and a dissimilar material included in the porous material of the present invention in an enlarged manner;

FIG. 3 is a cross-sectional view schematically showing one embodiment of a heat insulating film of the present invention;

FIG. 4 is a photograph showing a cross section of a porous material of Example 1 which is photographed by a transmission electron microscope (TEM); and FIG. 5 is a photograph showing a cross section of a porous material of Example 2 which is photographed by the transmission electron microscope (TEM).

MODE FOR CARRYING OUT THE INVENTION

Hereinafter, an embodiment of the present invention will be described. It should be understood that the present invention is not limited to the following embodiment, and the following embodiment to which change, improvement and the like are suitably added on the basis of ordinary knowledge of a person skilled in the art without departing from the gist of the present invention falls in the scope of the present invention.

[1] Porous Material:

One embodiment of a porous material of the present invention includes a porous material in which a plurality of pores are formed. Further, this porous material has $ZrO_2$ particles constituting a framework, and a dissimilar material present on the surfaces of the $ZrO_2$ particles. The dissimilar material includes at least one selected from a first group, at least one selected from a second group, or both of the at least one selected from the first group and the at least one selected from the second group. The first group is a group consisting of $SiO_2$, $TiO_2$, $La_2O_3$, $Al_2O_3$, $SrCO_3$, $Gd_2O_3$, $Nb_2O_5$, $Y_2O_3$, and a complex oxide including two or more of these oxides. The second group is a group consisting of $SiO_2$, $TiO_2$, $La_2O_3$, $Al_2O_3$, $SrCO_3$, $Gd_2O_3$, $Nb_2O_5$, $Y_2O_3$, and a complex oxide including at least one selected from the group consisting of the complex oxide including two or more of these oxides, and $ZrO_2$.

Such a porous material is usable as a material of a heat insulating film excellent in heat insulating performance. More specifically, in the porous material of the present invention, the dissimilar material is present on the surfaces of the $ZrO_2$ particles, whereby phonon scattering in a grain boundary between the $ZrO_2$ particles and the dissimilar material increases, and hence a thermal conductivity can be decreased (low heat conduction).

The porous material has a porous structure in which a plurality of pores are formed. That is, the porous material has a framework of a three-dimensional network structure, and voids other than this framework become the pores of the porous material. Further, this porous material has the $ZrO_2$ particles and the dissimilar material present on the surfaces of the $ZrO_2$ particles, as the framework of the porous structure.

It is to be noted that the concept that "the dissimilar material is present on the surfaces of the $ZrO_2$ particles" includes a state where the dissimilar material is interposed between the $ZrO_2$ particles. Additionally, the concept includes a state where the $ZrO_2$ particles come in contact with each other at a small point of contact, whereas the dissimilar material is present around the point of contact (i.e., around a neck (a narrow part) made by the $ZrO_2$ particles which come in contact with each other).

In the porous material, an average pore diameter is preferably from 0.5 to 500 nm, further preferably from 1 to 300 nm, and especially preferably from 10 to 100 nm. The above average pore diameter is preferably small, because the smaller the average pore diameter is, the lower the thermal conductivity becomes, but there is the fear that manufacturing cost increases. On the other hand, when the average pore diameter is in excess of 500 nm, there is the fear that the thermal conductivity excessively becomes high. Here, in the present description, "the average pore diameter of the porous material" is a value measured by using a mercury porosimeter (mercury porosimetry). When the average pore diameter is 10 nm or less, the average pore diameter is measured by a gas adsorbing method.

In the porous material, a porosity is preferably from 20 to 90% and further preferably from 20 to 80%. When the above porosity is smaller than 20%, there is the fear that the thermal conductivity increases. On the other hand, when the porosity is in excess of 90%, there is the fear that $ZrO_2$ particles weakly bond to each other and that a strength decreases. Here, in the present description, "the porosity" is a value measured by the mercury porosimeter (the mercury porosimetry).

There is not any special restriction on a shape of the porous material, but examples of the shape include a spherical shape, a plate shape, a fibrous shape, a needle shape and a billet shape. Among these shapes, the plate is preferable, from the viewpoint that the porous material is disposed in the form of layers in a case where a composition including the porous material in a raw material is applied to a substrate to form the heat insulating film. In the case of the plate shape, the surface may have any shape such as a square, a quadrangular shape, a triangular shape, a hexagonal shape, a round shape or an intermediate shape. FIG. 1 shows a plate-shaped porous material 1. It is to be noted that FIG. 1 is a perspective view schematically showing one embodiment of the porous material of the present invention.

It is preferable that the porous material is a plate having an aspect ratio of 3 or more and a minimum length of 0.1 to 50 μm. Furthermore, it is preferable that the porous material is a plate having an aspect ratio of 3 to 10 and a minimum length of 0.5 to 30 μm. When the porous material satisfies the above conditions, whereby in a case where this material is dispersed in an after-mentioned matrix to form the heat insulating film, a minimum length direction of the porous material is aligned in a thickness direction. Therefore, heat conduction of the heat insulating film in the thickness direction tends to be hard to occur, and the thermal conductivity further suitably decreases.

The aspect ratio is defined by a maximum length/a minimum length of the porous material. The maximum length is a length (denoted with symbol "M" in FIG. 1) of a maximized distance between a pair of parallel surfaces, when it is presumed that the porous material is sandwiched between the pair of parallel surfaces in an image obtained by image analysis. The minimum length is similarly a length (denoted with symbol "m" in FIG. 1) of a minimized distance between the pair of parallel surfaces, when it is presumed that the porous material is sandwiched between the pair of parallel surfaces in the image obtained by the image analysis, and the minimum length corresponds to a so-called thickness in the case of the plate shape. It is to be noted that the aspect ratio is an average value of 20 porous materials.

"The plate-shaped porous material" includes not only a flat plate-shaped porous material (a plate which is flat and does not bend), a bent plate-shaped porous material, and a plate-shaped porous material having a non-constant thickness (minimum length).

The porous material may be hollow particles in which cavities are present or may be particles in which any such cavities are not present. Additionally, it is meant that "the cavities" are different from pores of the porous structure, and are larger than these pores.

It is to be noted that confirmation of the $ZrO_2$ particles constituting the framework of the porous material and confirmation of a type of dissimilar material on the $ZrO_2$ particles can be carried out by using a transmission electron microscope (TEM).

It is preferable that the porous material is granulous piece in a size of 1 mm or less. The size of the porous material is a value obtained by measuring sizes of ten or more particles by use of the image obtained by the image analysis and calculating an average value of the sizes.

[1-1-1] $ZrO_2$ Particles:

In the $ZrO_2$ particles, an average particle diameter is preferably from 10 nm to 1 µm, further preferably from 10 nm to 500 nm, and especially preferably from 10 nm to 100 nm. The above average particle diameter is preferably small, because the smaller the average particle diameter is, the lower the thermal conductivity becomes. However, when the average particle diameter is smaller than 10 nm, there is the fear that the manufacturing cost increases. On the other hand, when the average particle diameter is in excess of 1 µm, there is the fear that the thermal conductivity increases. It is to be noted that "the average particle diameter of the $ZrO_2$ particles" is a value measured as follows. Particle diameters of ten or more $ZrO_2$ particles are measured by using an image of a microstructure obtained by observation in which the TEM is used, and an average value of the particle diameters is calculated. Additionally, in the $ZrO_2$ particles, another element (e.g., Mg, Ca, Y or the like) may be dissolved, or the particles may be made of a partially stabilized zirconia or a completely stabilized zirconia.

[1-1-2] Dissimilar Material:

A content ratio of the dissimilar material is preferably from 0.1 to 30 vol %, further preferably from 0.1 to 20 vol %, and especially preferably from 0.1 to 15 vol %. In the above range, there is the advantage that the thermal conductivity can further be decreased while maintaining characteristics of $ZrO_2$. When the content ratio of the dissimilar material is smaller than the above lower limit value, there is the fear that an effect of decreasing the thermal conductivity is insufficient. When the content ratio is in excess of the above upper limit value, there is the fear that a defect is generated in material characteristics such as a heat resistance and a strength which $ZrO_2$ has.

It is to be noted that the content ratio of the dissimilar material is a value obtained by element analysis in which the transmission electron microscope (TEM) is used.

It is preferable that the dissimilar material is present between the $ZrO_2$ particles. That is, it is preferable that the dissimilar material is interposed between the $ZrO_2$ particles (i.e., the dissimilar material is present in the grain boundary of the $ZrO_2$ particles). Thus, the dissimilar material is present between the $ZrO_2$ particles, whereby the phonon scattering in the grain boundary between the $ZrO_2$ particles further increases, and hence the thermal conductivity can further be decreased. FIG. 2 shows a state where a dissimilar material 30 is present between $ZrO_2$ particles 20 and 20. FIG. 2 is an enlarged view schematically showing one embodiment of the porous material of the present invention in an enlarged manner.

It is also preferable that the dissimilar material forms a solid solution in the $ZrO_2$ particles. Thus, when the dissimilar material forms the solid solution in the $ZrO_2$ particles, the thermal conductivity can further be decreased.

It is to be noted that when "the dissimilar material forms a solid solution in the $ZrO_2$ particles", there is meant a state where parts of elements constituting the dissimilar material in the $ZrO_2$ particles are present in a crystal structure of the $ZrO_2$ particles. For example, it is meant that Ti of $TiO_2$ of the dissimilar material is substituted for a site of Zr in the crystal structure of the $ZrO_2$ particles. Such a state can be confirmed by performing the element analysis by use of the transmission electron microscope (TEM) and also performing crystal structure analysis by X-ray diffraction.

The dissimilar material includes at least one selected from the first group, at least one selected from the second group, or both of the at least one selected from the first group and the at least one selected from the second group. That is, the dissimilar material may be, for example, $SiO_2$, $TiO_2$, $La_2O_3$, $Al_2O_3$ or the like alone, or may be a plurality of materials suitably selected therefrom. For example, in a case where the dissimilar material is $TiO_2$, Ti is dissolved in the $ZrO_2$ particles, and hence the thermal conductivity can further be decreased, It is also a preferable configuration that the dissimilar material includes at least two selected from the group consisting of $SiO_2$, $TiO_2$, $La_2O_3$, and $La_2Zr_2O_7$. In this way, when at least two selected from the group consisting of $SiO_2$, $TiO_2$, $La_2O_3$, and $La_2Zr_2O_7$ are present on the surfaces of the $ZrO_2$ particles, there is the advantage that the thermal conductivity further decreases.

In the case of two types of dissimilar materials, a value of a volume ratio of these types is preferably from 1/9 to 9. When the above value of the ratio is out of the above range, an effect obtained by adding both the types together might not be recognized.

It is preferable that a diameter of the dissimilar material is smaller than a diameter of the $ZrO_2$ particles. In this way, there is the advantage that the characteristics of $ZrO_2$ are easy to be maintained. It is to be noted that "the diameter of the dissimilar material" can be an average particle diameter of the dissimilar material. Additionally, it can be considered that "the diameter of the $ZrO_2$ particles" is the average particle diameter of the $ZrO_2$ particles.

In the dissimilar material, the average particle diameter is preferably from 0.1 to 300 nm, further preferably from 0.1 to 100 nm, and especially preferably from 0.1 to 50 nm. The above average particle diameter is preferably smaller, but when the average particle diameter is smaller than 0.1 nm, there is the fear that the manufacturing cost increases. On the other hand, when the average particle diameter is in excess of 300 nm, there is the fear that a defect is generated in material characteristics such as the heat resistance and strength which $ZrO_2$ has. That is, there is the fear that the heat resistance decreases and the strength decreases. It is to be noted that "the average particle diameter of the dissimilar material" is a value measured in the same manner as in the abovementioned average particle diameter of the $ZrO_2$ particles.

The porous material of the present invention may contain the other particles except the $ZrO_2$ particles and the dissimilar material. In a case where the other particles are contained, a total content ratio of the $ZrO_2$ particles and the dissimilar material is preferably 90% or more. When the above total content ratio of the $ZrO_2$ particles and the dissimilar material is smaller than 90%, there is the fear that the defect is generated in material characteristics such as the heat resistance and strength which $ZrO_2$ has. That is, there is the fear that the heat resistance decreases and the strength decreases.

In the porous material of the present invention, the thermal conductivity is preferably 1 W/mK or less, further preferably 0.5 W/mK or less, and especially preferably 0.3 W/mK or less. When the porous material having such a thermal conductivity is contained in the heat insulating film, a heat insulating effect can suitably improve. "The thermal conductivity of the porous material" is a value calculated as follows. First, a density of the porous material is measured by the mercury porosimeter. Next, specific heat of the porous material is measured by a DSC method. Next, a thermal diffusivity of the porous material is measured by a light AC method. Afterward, from a relational equation of the thermal diffusivity×the specific heat×the density=the thermal conductivity, the thermal conductivity of the porous material is calculated.

The porous material of the present invention is suitably usable as a filler.

[2] Manufacturing Method of Porous Material:

One embodiment of a manufacturing method of the porous material of the present invention has a slurry preparing step of preparing a green sheet forming slurry, a green sheet forming step of forming a green sheet, a fired body preparing step of preparing a fired body, and a crushing step of crushing the fired body to obtain the porous material. The above slurry preparing step is a step of preparing the green sheet forming slurry including the $ZrO_2$ particles, the dissimilar material and a pore former. The above green sheet forming step is a step of forming the green sheet forming slurry into a film to form the green sheet. The above fired body preparing step is a step of firing the formed green sheet to prepare the fired body in the form of the film. The above crushing step is a step of crushing the fired body to obtain the porous material.

Such a manufacturing method of the porous material has the above respective steps, and hence the porous material which is usable as the material of the heat insulating film excellent in heat insulating performance can be manufactured.

[2-1] Slurry Preparing Step:

The $ZrO_2$ particles and the dissimilar material included in the green sheet forming slurry are similar to the $ZrO_2$ particles and the dissimilar material of the abovementioned porous material of the present invention.

There is not any special restriction on the pore former as long as the pore former disappears to form a plurality of pores in the fired body preparing step. Examples of the pore former include carbon black, latex particles, melamine resin particles, polymethyl methacrylate (PMMA) particles, polyethylene particles, polystyrene particles, foamable resin, and water absorbable resin. Among these examples, carbon black is preferable because there is the advantage that a particle size is small and small pores are easy to be formed in the porous material.

The green sheet forming slurry contains another component such as a binder, a plasticizer or a solvent, except the $ZrO_2$ particles, the dissimilar material and the pore former. Examples of the binder include polyvinyl butyral resin (PVB), polyvinyl alcohol resin, polyvinyl acetate resin, and polyacrylic resin. Examples of the plasticizer include dibutyl phthalate (DBP), and dioctyl phthalate (DOP). Examples of the solvent include xylene and 1-butanol.

A content ratio of the $ZrO_2$ particles in the green sheet forming slurry is preferably from 5 to 20 vol %.

A content ratio of the dissimilar material in the green sheet forming slurry is preferably from 0.1 to 5 vol %.

A content ratio of the pore former in the green sheet forming slurry is preferably from 0 to 20 vol %.

A content ratio of "the other component" in the green sheet forming slurry is preferably from 70 to 90 vol %.

A viscosity of the green sheet forming slurry is preferably from 0.1 to 10 Pa·s. It is to be noted that an example of a method of obtaining such a viscosity is a method of performing a vacuum defoaming treatment.

[2-2] Green Sheet Forming Step:

The green sheet is preferably in the form of the film having a thickness of 10 to 50 μm after fired.

As a method of forming the green sheet forming slurry into the film, a heretofore known method can be employed, but a method in which, for example, a doctor blade device is used can be employed.

[2-3] Fired Body Preparing Step:

Firing conditions of the green sheet can suitably be set, but, for example, it is preferable that the firing is performed at 800 to 2300° C. for 0.5 to 20 hours, it is further preferable that the firing is performed at 800 to 1800° C. for 5 to 20 hours, and it is especially preferable that the firing is performed at 800 to 1300° C. for 5 to 20 hours.

[2-4] Crushing Step:

In a method of crushing the fired body, the fired body can be crushed at room temperature by use of, for example, a dry type beads mill, a roller mill or the like. Especially, to obtain the porous material "which is the plate having an aspect ratio of 3 or more and a minimum length of 0.1 to 50 μm", particle adjustment (classification) is preferably performed by using a pneumatic classifier.

[3] Heat insulating Film:

The heat insulating film of the present invention includes the porous material of the present invention as the material. Such a heat insulating film is excellent in heat insulating performance.

A heat insulating film 3 will be described with reference to FIG. 3. The heat insulating film 3 has the porous material 1 (a filler 10) of one embodiment of the present invention and a matrix 3m in which the porous material 1 is dispersed. That is, the porous material 1 is dispersed and disposed in the matrix 3m to be bonded to the porous material 1. The matrix is a component which is present around the porous material or between the particles, and the component bonds the particles to each other. FIG. 3 is a cross-sectional view schematically showing one embodiment of the heat insulating film 3 of the present invention.

The heat insulating film of the present invention preferably includes at least one of ceramics, glass and a resin as the matrix. From the viewpoint of a suitable heat resistance, the ceramics or glass is more preferable as the matrix. More specifically, examples of a material which forms the matrix include silica, alumina, mullite, zirconia, titania, silicon nitride, acid silicon nitride, silicon carbide, acid silicon carbide, calcium silicate, calcium aluminate, calcium aluminosilicate, aluminum phosphate, potassium aluminosilicate, and glass. These materials are preferably amorphous from the viewpoint that the thermal conductivity decreases. Additionally, in a case where the material of the matrix is ceramics, the matrix is preferably an assembly of particulates having particle diameters of 500 nm or less. When the assembly of the particulates having the particle diameters of 500 nm or less is used as the matrix, the thermal conductivity can further be decreased. Additionally, in a case where the material which forms the matrix is a resin, examples of the matrix include a silicone resin, a polyimide resin, a polyamide resin, an acrylic resin, and an epoxy resin.

In the heat insulating film, it is preferable that a porosity of the whole heat insulating film is from 10 to 90% and a porosity of the matrix is from 0 to 70%.

In the heat insulating film, a thickness is preferably from 0.1 to 5 mm. By such a thickness, the heat insulating effect can be obtained without adversely affecting characteristics of a substrate coated with the heat insulating film. It is to be noted that the thickness of the heat insulating film can suitably be selected in the above range in accordance with its use application.

In the heat insulating film, a heat capacity is preferably 1500 kJ/m$^3$K or less, further preferably 1000 kJ/m$^3$K or less, and most preferably 500 kJ/m$^3$K or less. In the present description, the heat capacity is generally argued per unit volume called volume specific heat, and hence a unit is kJ/m$^3$K. When the heat insulating film has such a low heat capacity, for example, a gas temperature in an engine combustion chamber is easy to drop after exhaust of fuel in a case where the heat insulating film is formed in the engine combustion chamber. Consequently, a problem such as abnormal combustion of an engine can be inhibited.

In the heat insulating film, the thermal conductivity is preferably 1.5 W/mK or less, further preferably 1 W/mK or less, and especially preferably 0.5 W/mK or less. The heat insulating film has such a low thermal conductivity, whereby heat conduction can be inhibited.

The heat insulating film of the present invention is usable as, for example, a heat insulating film to be formed on "a surface constituting the engine combustion chamber". Additionally, the heat insulating film of the present invention is usable as a heat insulating film to be formed on "an inner wall of an exhaust tube of a car", or a heat insulating film in a case where heat from a heat generating portion is to be cut off.

The heat insulating film of the present invention can be formed by coating the substrate with a coating composition and drying the coating composition. Additionally, the film can be formed by performing a heat treatment after the drying. At this time, a thick heat insulating film (a laminated body of the heat insulating films) can be formed by repeatedly performing the coating and the drying or the heat treatment to laminate the heat insulating films. Alternatively, the heat insulating film is formed on a virtual substrate, and then this virtual substrate is removed, thereby preparing a heat insulating film singly formed into a thin plate, and this heat insulating film may be adhesively bonded to or bonded to a targeted substrate (a substrate different from "the virtual substrate").

As the substrate, a metal, ceramics, glass, plastic, wood, cloth, paper or the like is usable. Especially, examples of the substrate made of the metal include iron, an iron alloy, stainless steel, aluminum, an aluminum alloy, a nickel alloy, a cobalt alloy, a tungsten alloy, and a copper alloy.

The coating composition including the above porous material and one or more selected from the group consisting of an inorganic binder, an inorganic polymer, an oxide sol and water glass is usable. Furthermore, the coating composition may include a dense filler, a viscosity modifier, a liquid medium, a dispersing agent or the like.

Specific substances to be included in the coating composition are cement, bentonite, aluminum phosphate, silica sol, alumina sol, boehmite sol, zirconia sol, titania sol, tetramethyl orthosilicate, tetraethyl orthosilicate, polysilazane, polycarbosilane, polyvinyl silane, polymethyl silane, polysiloxane, polysilsesquioxane, geopolymer, sodium silicate and the like.

EXAMPLES

Hereinafter, the present invention will specifically be described on the basis of examples, but the present invention is not limited to these examples.

Example 1

To zirconia powder which was a ZrO$_2$ raw material (ZrO$_2$ particles), there were added SiO$_2$ as a dissimilar material, carbon black as a pore former, polyvinyl butyral resin (PVB) as a binder, dioctyl phthalate (DOP) as a plasticizer, and xylene and 1-butanole as solvents. This was used as a raw material composition. Amounts of the respective components to be added to the raw material composition were 10.8 vol % of zirconia powder, 1.2 vol % of SiO$_2$, 10.8 vol % of the binder, 6 vol % of the plasticizer, and 71.2 vol % of the solvent. It is to be noted that in Table 1, "vol %" of each component indicates "vol %" of each component to a total of the ZrO$_2$ particles, the dissimilar material and the pore former.

Next, this raw material composition was mixed in a ball mill for 30 hours, and a green sheet forming slurry (a coating composition) was prepared. Afterward, a vacuum defoaming treatment of this slurry was performed, and then a viscosity was adjusted into 4 Pa·s. Afterward, the above slurry was applied in the form of a film by a doctor blade device so that a thickness of the slurry after fired was 10 μm, and a green sheet was formed. This green sheet was cut into a dimension of vertically 50 mm×horizontally 50 mm. Afterward, this formed body was degreased at 600° C. for 5 hours, and then fired at 1100° C. for 2 hours, to obtain a thin plate-shaped fired body. Afterward, the obtained fired body was crushed by using a dry type beads mill, to obtain a porous material.

Next, in the obtained porous material, a diameter of the ZrO$_2$ particles was 60 nm and a diameter of the dissimilar material (SiO$_2$) was 15 nm. In the porous material, an average pore diameter was 0.13 μm and a porosity was 63%. Additionally, in the porous material, a thermal conductivity was 0.15 W/mK and a heat capacity was 840 kJ/m$^3$K. It is to be noted that "the thermal conductivity and the heat capacity of the porous material" are values obtained by measuring a thermal conductivity and a heat capacity of the fired body (before crushed), respectively. Additionally, in the obtained porous material, an aspect ratio was 5 and a minimum length was 10 μm. Table 1 shows the results.

FIG. 4 is a photograph showing a cross section of a porous material of the present example which was photographed by a transmission electron microscope (TEM).

(Content Ratio of Dissimilar Material)

A content ratio of the dissimilar material was obtained by chemically analyzing the porous material. On the basis of the obtained analysis result, a content in terms of a compound added as the dissimilar material (SiO$_2$ in the case of Example 1) was calculated as vol %.

(Thermal Conductivity of Porous Material)

The thermal conductivity of the porous material was measured as follows. First, a formed body of the same material as the porous material in 0.5 mm×5 mm×30 mm was separately fired, a thermal diffusivity was measured by a light AC method, specific heat of the same material was measured by a DSC method, and a product of the thermal diffusivity, the specific heat and a density (an apparent particle density) was obtained as the thermal conductivity of the porous material. The apparent particle density was measured by a liquid immersion method in which mercury was used.

crushing the heat insulating film and then measuring the specific heat by the DSC method.

Examples 2 to 16 and Comparative Example 1

First, the procedure of Example 1 was repeated to obtain porous materials on conditions shown in Table 1. Next, the above respective measurements were carried out in the same manner as in Example 1. Table 1 shows the results.

FIG. 5 is a photograph showing a cross section of the porous material of Example 2 which was photographed by a transmission electron microscope (TEM).

TABLE 1

| | Preparing conditions of porous material | | | Characteristics of filler (porous material) | | | | | | | |
|---|---|---|---|---|---|---|---|---|---|---|---|
| | $ZrO_2$ particles (amount to be added (vol %)) | Dissimilar material (amount to be added (vol %)) | Firing temp. (° C.) | Dia. of $ZrO_2$ particles (nm) | Dia. of dissimilar material (nm) | Content ratio of dissimilar material (vol %) | Aspect ratio of porous material | Minimum length (μm) | Ave. pore dia (μm) | Porosity (%) | Thermal conductivity (W/mK) | Heat capacity (kJ/m³K) |
| Comparative Example 1 | $ZrO_2$(100) | None | 1100 | 300 | — | — | 5 | 10 | 0.45 | 45 | 1.1 | 1290 |
| Example 1 | $ZrO_2$(90) | $SiO_2$(10) | 1100 | 60 | 15 | 8 | 5 | 10 | 0.13 | 63 | 0.15 | 840 |
| Example 2 | $ZrO_2$(90) | $TiO_2$(10) | 1100 | 100 | 8 | 9 | 5 | 10 | 0.19 | 70 | 0.12 | 790 |
| Example 3 | $ZrO_2$(96) | $La_2O_3$(4) | 1100 | 70 | 15 | 3 | 5 | 10 | 0.15 | 73 | 0.11 | 800 |
| Example 4 | $ZrO_2$(90) | $SiO_2$(5) + $TiO_2$(5) | 1100 | 90 | 15 | 8 | 5 | 10 | 0.18 | 62 | 0.14 | 880 |
| Example 5 | $ZrO_2$(90) | $SiO_2$(10) | 1000 | 50 | 15 | 9 | 5 | 10 | 0.12 | 66 | 0.08 | 770 |
| Example 6 | $ZrO_2$(90) | $TiO_2$(10) | 1000 | 95 | 8 | 9 | 5 | 10 | 0.18 | 73 | 0.08 | 730 |
| Example 7 | $ZrO_2$(96) | $La_2O_3$(4) | 1000 | 65 | 15 | 4 | 5 | 10 | 0.14 | 76 | 0.07 | 730 |
| Example 8 | $ZrO_2$(90) | $SiO_2$(5) + $TiO_2$(5) | 1000 | 85 | 15 | 9 | 5 | 10 | 0.17 | 65 | 0.08 | 810 |
| Example 9 | $ZrO_2$(96) | $La_2Zr_2O_7$(4) | 1100 | 70 | 15 | 3 | 5 | 10 | 0.18 | 72 | 0.1 | 800 |
| Example 10 | $ZrO_2$(96) | $Al_2O_3$(4) | 1100 | 150 | 15 | 4 | 5 | 10 | 0.16 | 64 | 0.19 | 890 |
| Example 11 | $ZrO_2$(96) | $SrCO_3$(4) | 1100 | 150 | 8 | 3 | 5 | 10 | 0.17 | 65 | 0.18 | 870 |
| Example 12 | $ZrO_2$(96) | $Gd_2O_3$(4) | 1100 | 150 | 8 | 3 | 5 | 10 | 0.16 | 66 | 0.16 | 850 |
| Example 13 | $ZrO_2$(96) | $Nb_2O_5$(4) | 1100 | 150 | 8 | 3 | 5 | 10 | 0.15 | 67 | 0.14 | 840 |
| Example 14 | $ZrO_2$(90) | $Y_2O_3$(10) | 1100 | 250 | 15 | 9 | 5 | 10 | 0.15 | 66 | 0.15 | 860 |
| Example 15 | $ZrO_2$(99) | $TiO_2$(1) | 1100 | 150 | 8 | 1 | 5 | 10 | 0.38 | 65 | 0.15 | 870 |
| Example 16 | $ZrO_2$(80) | $TiO_2$(20) | 1100 | 80 | 30 | 19 | 5 | 10 | 0.11 | 72 | 0.11 | 790 |

(Heat Capacity of Porous Material)

The heat capacity of the porous material was measured as follows. First, a formed body of the same material as the porous material in 0.5 mm×5 mm×30 mm was separately fired, specific heat was measured by the DSC method, and a product of the specific heat and a density (an apparent particle density) was obtained as the heat capacity of the porous material. The apparent particle density was measured by the liquid immersion method in which mercury was used.

Next, a matrix material (a material forming a matrix) and the porous material were mixed at a volume ratio of 20:80. Further, this composition was applied onto an aluminum alloy of a substrate, followed by drying, and then a heat treatment was carried out at 200° C. for 2 hours to form a heat insulating film (a thickness of 100 μm) on the substrate.

The obtained heat insulating film had a thermal conductivity of 0.3 W/mK. Additionally, the heat insulating film had a heat capacity of 800 kJ/m³K.

(Thermal Conductivity and Heat Capacity of Heat insulating Film)

As a thermal conductivity of the heat insulating film, there was measured a thermal conductivity in a cross section parallel to a thickness direction of the heat insulating film in a laser flash two layers model. The heat capacity of the heat insulating film was calculated from a product of specific heat×a density (the apparent particle density) obtained by It could be confirmed that each of the porous materials of Examples 1 to 16 was usable as a material of a heat insulating film excellent in heat insulating performance as compared with the porous material of Comparative Example 1.

INDUSTRIAL APPLICABILITY

A porous material of the present invention is usable as a material of a heat insulating film excellent in heat insulating performance. The heat insulating film of the present invention is usable as, for example, a heat insulating film formed on "a surface constituting an engine combustion chamber".

DESCRIPTION OF REFERENCE NUMERALS

1: porous material, 3: heat insulating film, 3m: matrix, 10: filler, 20: $ZrO_2$ particle, 30: dissimilar material, M: maximum length, and m: minimum length.

The invention claimed is:

1. A porous material comprising a porous structure in which a plurality of pores are formed, and comprising, as a framework of the porous structure, $ZrO_2$ particles and a dissimilar material being present on the surfaces of the $ZrO_2$ particles and being interposed at least between the $ZrO_2$ particles, the dissimilar material including at least one selected from a first group, at least one selected from a second group, or both, wherein the first group is a group consisting of $SiO_2$, $TiO_2$, $La_2O_3$, $Al_2O_3$, $SrCO_3$, $Gd_2O_3$, $Nb_2O_5$, $Y_2O_3$, and a first complex oxide comprising two or more of $SiO_2$, $TiO_2$, $La_2O_3$, $Al_2O_3$, $SrCO_3$, $Gd_2O_3$, $Nb_2O_5 Y_2O_3$; and the second group is a group consisting of $SiO_2$, $TiO_2$, $La_2O_3$, $Al_2O_3$, $SrCO_3$, $Gd_2O_3$, $Nb_2O_5$, $Y_2O_3$, and a second complex oxide comprising at least one of $SiO_2$, $TiO_2$, $La_2O_3$, $Al_2O_3$, $SrCO_3$, $Gd_2O_3$, $Nb_2O_5$, $Y_2O_3$, and $ZrO_2$, wherein the content ratio of the dissimilar material is from 0.1 to 30 vol %.

2. The porous material according to claim 1, wherein the dissimilar material includes at least two selected from the group consisting of $SiO_2$, $TiO_2$, $La_2O_3$ and $La_2Zr_2O_7$.

3. The porous material according to claim 1, wherein a diameter of the dissimilar material is smaller than a diameter of the $ZrO_2$ particles.

4. The porous material according to claim 1, wherein a diameter of the dissimilar material is from 0.1 to 300 nm.

5. The porous material according to claim 1, wherein a thermal conductivity is 1 W/mK or less.

6. The porous material according to claim 1, which is granulous piece in a size of 1 mm or less.

7. The porous material according to claim 1, which is a plate having an aspect ratio of 3 or more and a minimum length of 0.1 to 50 μm.

8. A heat insulating film comprising: the porous material according to claim 1, and a matrix in which the porous material is dispersed.

* * * * *